(12) United States Patent
Garver

(10) Patent No.: US 6,322,024 B1
(45) Date of Patent: Nov. 27, 2001

(54) LIFT MULTIPLYING DEVICE FOR AIRCRAFT

(75) Inventor: Theodore Garver, Canfield, OH (US)

(73) Assignee: E-Win Corporation, Canfield, OH (US)

(*) Notice: Subject to any disclaimer, the term of this patent is extended or adjusted under 35 U.S.C. 154(b) by 0 days.

(21) Appl. No.: 09/365,207

(22) Filed: Jul. 30, 1999

Related U.S. Application Data

(63) Continuation-in-part of application No. 08/893,454, filed on Jul. 11, 1997, now abandoned.

(51) Int. Cl.[7] .................................................. B64C 23/02
(52) U.S. Cl. ........................................ 244/206; 244/134 R
(58) Field of Search ............................ 244/206, 134 RA

(56) References Cited

U.S. PATENT DOCUMENTS

| | | | |
|---|---|---|---|
| 1,785,300 | * 12/1930 | Castelcicala | 244/206 |
| 1,796,860 | * 3/1931 | Bowers | 244/206 |
| 1,840,594 | * 1/1932 | Minor | 244/206 |
| 1,927,538 | * 9/1933 | Zaparka | 244/206 |
| 2,399,648 | * 5/1946 | Love | 244/134 A |
| 3,140,065 | 7/1964 | Alvarez-Calderon | |
| 3,179,354 | * 4/1965 | Alvarez-Calderon | 244/206 |
| 3,448,714 | * 6/1969 | Brooks | 244/206 |
| 4,100,876 | * 7/1978 | Feleus | 244/206 |
| 4,323,209 | 4/1982 | Thompson | 244/199 |
| 5,230,486 | 7/1993 | Patterson | 244/199 |

FOREIGN PATENT DOCUMENTS

| | | | |
|---|---|---|---|
| 2022087 | 7/1992 | (CA) . | |
| 2134197 | 4/1993 | (CA) . | |
| 446719 | 12/1912 | (FR) . | |
| 614.091 | 4/1926 | (FR) . | |
| 1053332 | * 2/1954 | (FR) | 244/206 |
| 519882 | * 4/1940 | (GB) | 244/134 A |

OTHER PUBLICATIONS

"Publications Scientifiques Et Techniques" 1938.
"Boundary Layer Theory" Hermann Soliciting $7^{th}$ Edition McGraw–Hill, 1979.
"Fluid Dynamics of Airfoils with Moving Surface Boundary–Layer Control" J. Aircraft vol. 25, No. 2 Feb., 1988.
Moving Surface Boundary–Layer Control: Studies with Bluff Bodies and Application AIAA Journal, vol. 24, 1991.
"Moving Surface Boundary–Layer Control A Review" Journal of Fluids and Structures, 1997.

* cited by examiner

Primary Examiner—Galen L. Barefoot
(74) Attorney, Agent, or Firm—Robert G. Lev

(57) ABSTRACT

The invention utilizes a moving band, typically on an airplane, to increase the apparent speed and therefore the lift of any body moving through a fluid. The invention will allow take-offs and landings at reduced speeds and allow a greater load. It will also reduce drag due to turbulence thereby allowing a flatter design of the wing, and reducing boundary later separation.

12 Claims, 2 Drawing Sheets

LIFT MULTIPLYING DEVICE FOR AIRCRAFT

CROSS REFERENCE TO RELATED INVENTIONS

This application is a continuation-in-part of U.S. patent application Ser. No. 08893,454; filed Jul. 11, 1997 now abandoned.

FIELD OF THE INVENTION

The present invention relates in general to airfoils. In particular, the present invention is directed to a dynamic system for altering lift characteristics of various surfaces that can be used as air foils on vehicles.

BACKGROUND OF THE INVENTION

Conventional prior art in this field includes basic methods of causing lift in an aircraft wing. Bernoulli's Principal which states that pressure will be lower on the upper surface of a wing because the air must travel faster over the longer curved surface of the wing.

One approach to altering lift characteristics of air foils, based upon the Bernoulli Principal, has been through the use of moveable surfaces on various parts of air foils on a variety of vehicles ranging from airplanes to submarines. Examples of the various techniques are found in the file wrapper history of the parent application Ser. No. 08893,454, incorporated herein by reference. Many of these examples of conventional art use rollers to alter air foil surface characteristics. Others propose rotating bands on portions of air foil surfaces. However, no example of the conventional art provides a comprehensive system for controlling the lift of an air foil. Nor has the entire body of the conventional art explored the various applications in which rotating bands can be used to alter the characteristics of an air foil and thereby the lift performance of a vehicle associated with that air foil.

SUMMARY OF THE INVENTION

Accordingly, it is one object of the present invention to overcome the limitations of conventional art air foils.

It is another object of the present invention to provide a variable lift control system for various types of vehicles moving through fluid mediums, such as air and water.

It is an additional object of the present invention to provide a dynamic system for automatically controlling lift in vehicles moving through fluid mediums.

Still another object of present invention is to provide a variable air foil configuration capable of adjusting lift characteristics responsive to the circumstances of a vehicle associated with those air foils.

It is still another object of the present invention to provide a dynamic lift control system capable of clearing an air foil of ice or other environmental accumulations.

It is again a further object of the present invention to provide a dynamic lift control mechanism that can be used on a wide variety of structures for a wide variety of different vehicles that move through fluid mediums.

It is again a further object of the present invention to provide a dynamic system capable of altering the performance of air foil control surfaces.

It is again another object of the present invention to provide a dynamic lift system that permits aircraft to land and take off on shorter runways than is possible with conventional airfoils.

It is still an additional object of the present invention to provide a dynamic lift system that greatly enhances the lift capability of an airplane without a substantial increase in the overall cost of the airplane.

It is yet another object of the present invention to reduce the drag, or turbulence and the boundary layer separation which occurs on airplanes under certain conditions.

These and other goals and objects of the present invention are achieved by a vehicle configured to move through a fluid medium. The vehicle includes a motivating device for moving the vehicle through the fluid medium and at least one lifting structure having two fluid interface surfaces for at least one control structure having at least two fluid interface surfaces. At least one of those lifting or control structures includes a moveable lift control device constituted by at least one continuous moveable band arranged to move at a plurality of different speeds. This movement adjusts the apparent speed of the vehicle through the fluid medium and controls a fluid vortex at at least one of the fluid interface surfaces. As a result, the lift of the vehicle is variably adjusted based upon the speed of the movable band and the speed of the vehicle itself.

DETAILED DESCRIPTION OF THE INVENTION

The invention disclosed multiplies the lift cause by the faster flow of air by including a band which travels around the wing in a manner which causes the lift to be equivalent to that of the airplane that is traveling faster than the actual speed of the airplane. Because the amount of lift is proportional to the square of the apparent speed, the increase in lift can be large.

A device is disclosed primarily for increasing the lift or upward force in bodies moving through a fluid. The device has primary applicability to airplanes, but has applicability in any other body moving through a fluid, including watercraft and land vehicles. The device increases the lift of an airplane wing by creating a greater speed on a moving band than exists, on the wing alone. The invention is a moving surface which, is itself attached to a body which is moving relative to the fluid. The moving surface is generally described as a band herein, but may be any surface which moves relative to the body to be lifted, including, for instance, a series of solid panels which might be used for greater structural integrity. The band moves in such a manner that its upper surface travels in the opposite direction to the direction of travel of the body relative to the fluid and the lower surface of the band travels in the direction of the movement of the body relative to the fluid. The upper surface of the band is therefore moving in the same direction as the fluid flow relative to the body and the lower surface of the band is moving in opposition to the fluid.

Figure 1:
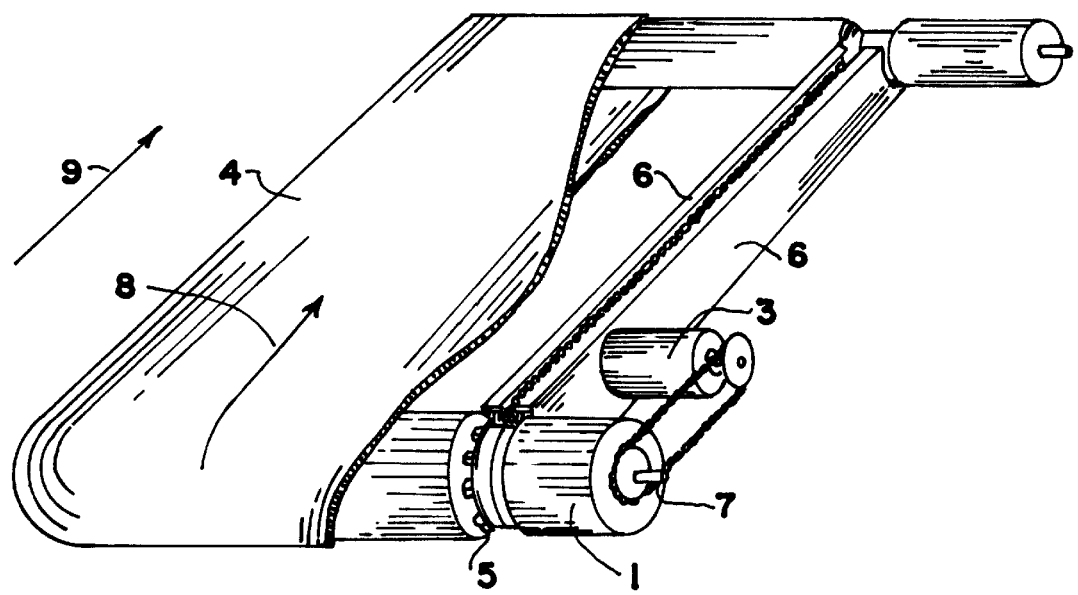
FIG. 1 is cut away perspective view depicting one embodiment of the moving band included in the present invention.

FIG. 1 shows a cutaway depiction of the invention not connected to the device to be lifted. The moving band is shown traveling on rollers and driven by an unspecified power source. Number 1 is the lead roller on which the band rides. Number 2 is the similar rear roller. Number 3 is the power source to drive the rollers. Number 4 is the band itself. Number 5 is an unspecified drive mechanism for the rollers. Number 6 is an unspecified guide track to keep the band in place. Number 7 shows axles for the rollers. Number 8 indicates the direction of movement relative to the invention. In FIG. 1 the invention is shown without a convex upper surface which would be almost universal on a conventional airplane wing. The configuration shown greatly reduces the turbulence.

Figure 2:
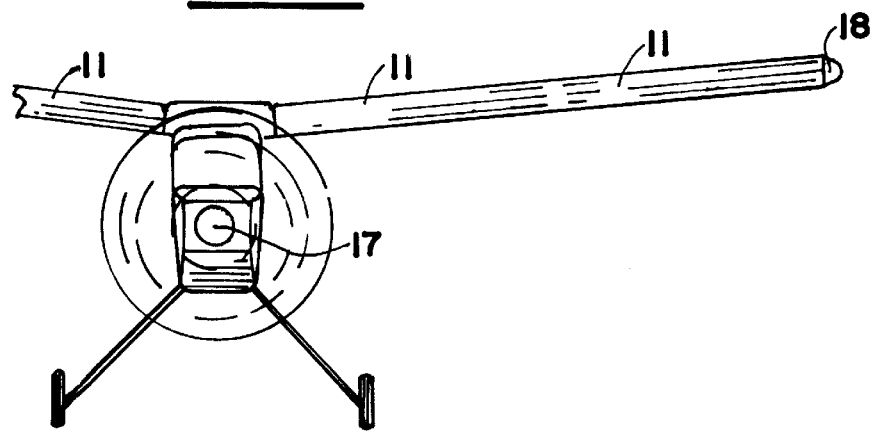
FIG. 2 is a front view of an airplane equipped with the present invention.

FIG. 2 shows an airplane with the invention on it. Number 11 is a unit of the invention mounted on the wing. Number 17 is a conventional propeller shaft. Number 18 is the stationary wing tip which does not incorporate the invention.

Figure 3:
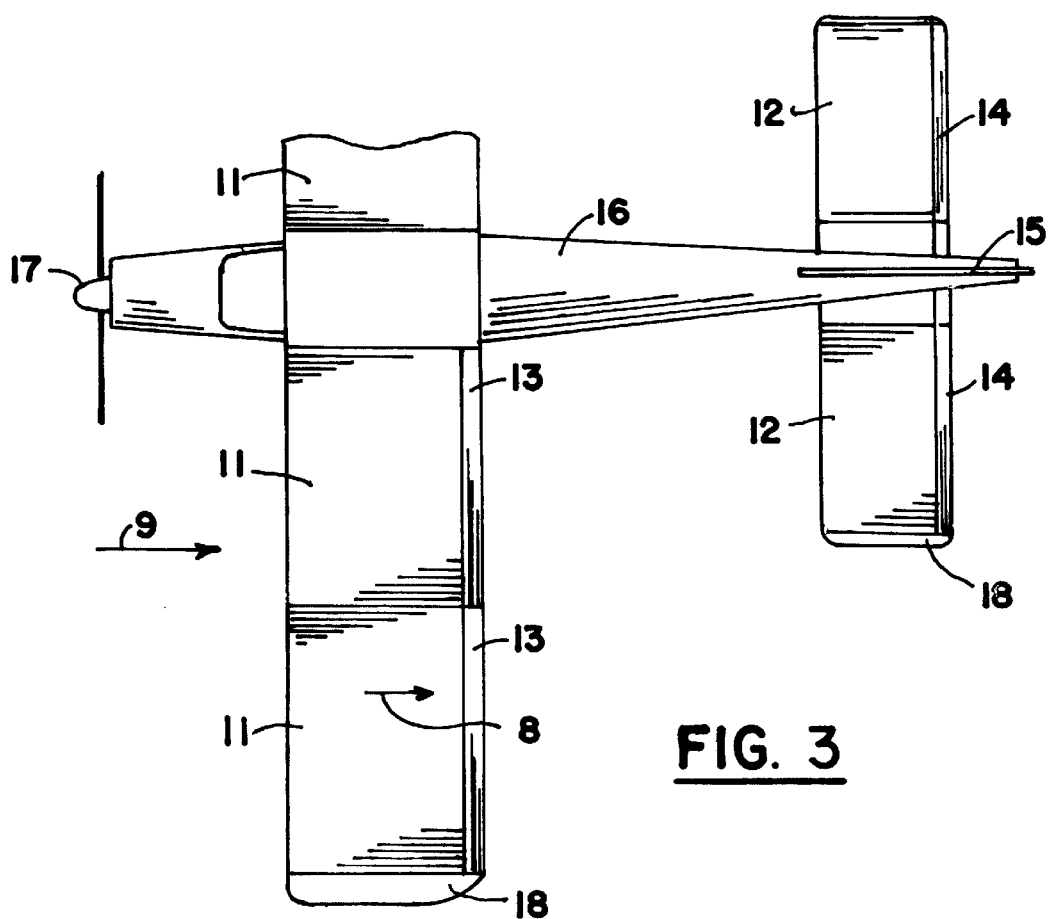
FIG. 3 is a top view of the airplane of FIG. 2, depicting the application of the present invention to both the wings and the rear elevators.

FIG. 3 shows the top view of the airplane shown in FIG. 2. Number 8 again indicates the direction of the band movement, and number 9 indicates the direction of the air flow relative to the band. Number 11 is the wing unit of the invention and Number 12 is a similar tail unit. Number 13 is the wing surface control (the flap) located behind the invention, and Number 14 is the similar tail surface control. Number 15 is the upright section of a conventional airplane tail. Number 16 is a conventional airplane fuselage. Number 17 is a propeller shaft and Number 28 shows the wing tips extending beyond the invention.

Figure 4:
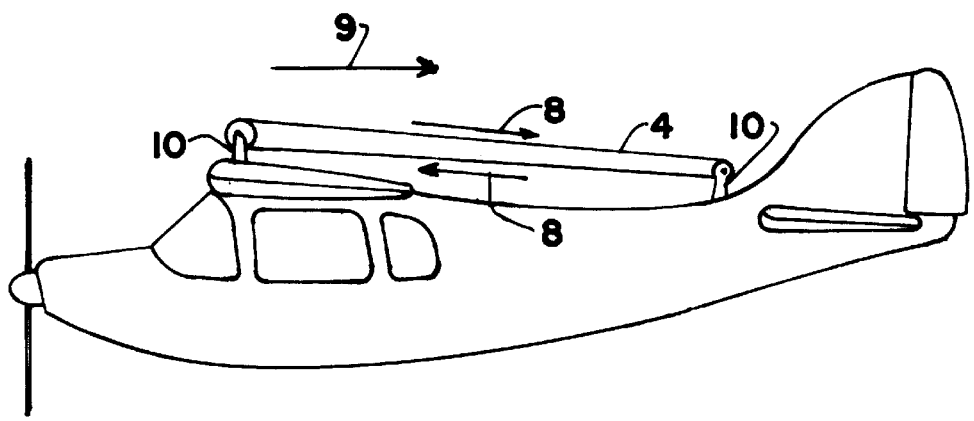
FIG. 4 is a side view of a plane employing another embodiment of the present invention.

FIG. 4 shows another embodiment of the invention, with the invention mounted on the top of the fuselage of the airplane. In practice the invention in this configuration would probably be exposed only during take-off and landing and folded into the body of the plane during flight as landing gear are now. Number 4 is the moving band. Number 8 shows the direction in which the band is moving. Number 9 shows the direction in which the air is moving in relation to the band, and number 10 shows the brackets to attach the invention to the airplane.

Because the band speed is added to the speed of the wing, the lift forces are equivalent to the lift associated with a greater speed than the actual speed of the airplane. The simplest embodiment of the invention is as shown in FIGS. 2 and 3 with the invention incorporated into an airplane wing, but the invention is not confined to such a configuration, nor to airplanes. The invention can also be placed in a separate pod suspended below the wing, can be placed above the fuselage and would often have to be placed on the tail sections in order to balance the upward thrust of a similar device on the wing. Further embodiments are possible. The invention can also be incorporated into or attached to a watercraft or land vehicle.

In conventional aircraft the principles of fluid mechanics are employed to cause lift by making the upper surface of the wing concave so that the air must move faster over it than over the bottom surface. A second factor creating lift is the attitude or angle of attack. The invention does not have an effect on the lift caused by a positive angle of attack. The invention does increase the apparent speed of the airplane to increase the lift due to fluid mechanics.

Conventional aircraft have wings with a convex upper surface and a positive angle of attack. Both of these factors cause turbulence because of the tendency of the air or other fluid to curl around the raised part of the surface. The swirling of the air around the raised surface is the principle turbulence encountered in aircraft. The invention will enable wings to be used with flat or nearly flat surfaces in order to greatly reduce or eliminate these conditions and therefore reduce turbulence. The reduction in turbulence will, in turn, increase efficiency and reduce fuel costs.

Additionally an aircraft wing is subject to a phenomena known as "boundary layer separation" which is the detachment of the layer of air from the wing surface. All lift to the rear of this detachment is lost, in extreme cases resulting in "stall". The invention greatly reduces and in some circumstances eliminates boundary layer separation.

The effectiveness of the invention is dependent upon the motion of the airplane or other body, or, in some instances upon the motion of the air or other fluid against the body to be lifted. In all circumstances the effect of the invention is only to multiply motion that is otherwise present. It will not lift as a helicopter, but will allow slower take-offs and landings on shorter runways.

A similar embodiment is shown in FIGS. 2 and 3 except that the invention is contained partially within the wing or tail so that it does not form the trailing edge of the wing or tail. The invention may also be used in a manner so that it does not form either the leading or trailing edge of the wing or simply in a manner that it does not form the leading edge of the wing or tail.

A different embodiment is shown in FIG. 4. This embodiment can be used either as original equipment or as a retrofit on existing aircraft. In this embodiment a structure is created on the fuselage (or other part) of the airplane to contain a moving band which is driven and has its speed controlled as the other embodiments. This embodiment (as the other embodiments) may or may not contain a mechanism which will allow the invention to be withdrawn into the body of the airplane during level flight as landing gear are now often withdrawn. A very similar embodiment (not shown) would be to create a structure to hang under the wing with the band moving around it.

In another embodiment (not shown) the band is placed on the fuselage of the plane, an area previously little used to provide lift. The band penetrates the top of the fuselage so that the bottom of the band is not exposed to the wind, but instead is enclosed in the airplane. This configuration allows a less acute angle or larger radius of the rotor driving the band, which will, in turn allow less flexible materials to be used. A similar band can be used on the bottom of the fuselage(or conceivably a single band going through the entire fuselage). As with the other embodiments the speed of the band should be controlled and the power can be derived either from an independent motor or from the engine of the airplane.

The speed of one or more of the bands can be varied, and the speed controlled by means of a computer. Changes in velocity of the moving band will consequently alter the additional lift provided to the wing or airfoil. Also, the use of rotating bands on wings, flaps, elevators, and ailerons provides and effective mechanism for controlling and otherwise reducing ice formation on critical surfaces.

Other embodiments of the present invention can be used in either land or water vehicles. For water vehicles, in particular, the present invention can be used to enhance the effectiveness of control surfaces. For land vehicles, the aerodynamic capabilities of critical surfaces can be improved by the application of the present invention, thereby increasing the speed and efficiency of the vehicle. Accordingly, application of the present invention will be particularly useful in racing vehicles. However, the present invention is not limited thereto. Rather, the present invention can be applied to optimize the aerodynamic surfaces of large trucks, thereby increasing fuel efficiency.

Although a number of embodiments of the present invention have been provided as examples, the present invention is not limited thereby. Rather, the present invention should be construed as encompassing any and all variations, permutations, modifications, adaptations and embodiments that would occur to one skilled in the arts of fluid dynamics, airplane design and chip design, having been taught the present invention by this application. Accordingly, the present invention should be limited only by the following claims.

I claim:

1. A vehicle configured to move through a fluid medium, said vehicle having motivating means for moving said vehicle through said fluid medium and at least one structure selected from a group consisting of at least one lifting structure having at least two fluid interface surfaces and at least one control structure having at least two fluid interface surfaces, said at least one structure comprising:

moveable lift control means constituted by at least one continuous moveable band arranged to move at a plurality of speeds for adjusting the apparent speed of said vehicle through said fluid medium and controlling a fluid vortex of at least one of said fluid interface surface thereby variably adjusting lift of said vehicle, whereby turbulence at said fluid interface surface and boundary layer separation at said fluid interface surface are reduced.

2. The vehicle of claim 1, wherein said moveable lift control means comprise at least one moveable band arranged to follow a contour formed by at least two fluid interface surfaces of said at least one of said lift and control structures.

3. The vehicle of claim 2, wherein said lift control means comprises a second motivating means for moving said nonviable band along at least one of said fluid interface surfaces.

4. The vehicle of claim 3, wherein said second motivating means is mechanically linked to said first motivating means.

5. The vehicle of claim 3, wherein said second motivating means is mechanically independent of said motivating means.

6. The vehicle of claim 5, wherein said second motivating means comprise an electric motor.

7. The vehicle of claims 4, wherein said second motivating means comprise a hydraulic motivating system.

8. The vehicle of claim 4, wherein said second motivating means comprise a pneumatic motivating system.

9. The vehicle of claim 2, wherein said lift control means further comprise a plurality of rollers arranged along a contour defined by at least two fluid interface surfaces of at least one of said lifting control structures.

10. The vehicle of claim 9, wherein said vehicle comprises and airplane and said lift structure comprises at least one wing arranged to lift said airplane, said at least one moveable band being arranged along a contour defined by at least two fluid interface surfaces of said at least one wing.

11. The vehicle of claim 10, wherein said airplane further comprises at least one control structure selected from a group consisting of ailerons, flaps, and elevators, at least one of said selected control structures comprising at least one moveable band arranged along a contour defined by at least two fluid interface surfaces of said selected one of said control structures.

12. The vehicle of claim 10, wherein said airplane further comprises a fuselage and said control means further comprises a rotating band mounted above said fuselage.

\* \* \* \* \*